United States Patent
Reigl et al.

(10) Patent No.: US 9,091,363 B2
(45) Date of Patent: Jul. 28, 2015

(54) HIGH TEMPERATURE STEAM VALVE

(75) Inventors: Martin Reigl, Ehrendingen (CH); Franz Suter, Gebenstorf (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 204 days.

(21) Appl. No.: 13/331,718

(22) Filed: Dec. 20, 2011

(65) Prior Publication Data

US 2012/0153208 A1     Jun. 21, 2012

(30) Foreign Application Priority Data

Dec. 20, 2010  (EP) .................................... 10196025

(51) Int. Cl.
    *F16K 27/00*     (2006.01)
    *F16K 27/12*     (2006.01)
    *F01D 17/14*     (2006.01)
    *F16K 49/00*     (2006.01)

(52) U.S. Cl.
    CPC .............. *F16K 27/12* (2013.01); *F01D 17/145* (2013.01); *F16K 49/00* (2013.01)

(58) Field of Classification Search
    CPC ....... F16K 49/00; F16K 49/005; F16K 27/12; F16K 27/00; F01D 17/145
    USPC ......... 251/293, 318, 319, 341, 347, 366, 368; 60/645, 670; 137/338
    See application file for complete search history.

(56) References Cited

U.S. PATENT DOCUMENTS

| | | | | |
|---|---|---|---|---|
| 1,891,374 A | * | 12/1932 | Ehemann ........................ | 251/120 |
| 2,301,176 A | * | 11/1942 | Elliott ............................ | 251/360 |
| 2,610,820 A | * | 9/1952 | Markel et al. ................. | 251/225 |
| 3,290,003 A | * | 12/1966 | Kessler .......................... | 251/318 |
| 3,556,463 A | | 1/1971 | Williams | |
| 3,916,941 A | | 11/1975 | Usry | |
| 4,383,546 A | * | 5/1983 | Walters, Jr. .................... | 137/240 |
| 4,633,897 A | * | 1/1987 | Effenberger ............. | 137/315.35 |
| 4,719,939 A | | 1/1988 | Killian | |
| 5,240,030 A | | 8/1993 | Wang | |
| 5,678,803 A | * | 10/1997 | Shinohara et al. ............. | 251/368 |
| 5,711,510 A | * | 1/1998 | Stary ............................. | 251/214 |
| 6,070,605 A | * | 6/2000 | Steenburgh ........................ | 137/1 |
| 7,070,165 B2 | | 7/2006 | Jornod | |
| 7,481,058 B2 | | 1/2009 | Fukuda et al. | |
| 2003/0066981 A1 | * | 4/2003 | Cross et al. ................... | 251/292 |
| 2005/0109400 A1 | | 5/2005 | Glime et al. | |

(Continued)

FOREIGN PATENT DOCUMENTS

| | | |
|---|---|---|
| CN | 1888487 A | 1/2007 |
| CN | 1888490 A | 1/2007 |

(Continued)

OTHER PUBLICATIONS

European Search Report for EP 10196025.0 dated May 18, 2011.

(Continued)

*Primary Examiner* — Jessica Cahill

(74) *Attorney, Agent, or Firm* — Buchanan Ingersoll & Rooney PC

(57) ABSTRACT

A high temperature actuated steam valve is disclosed that has a connector extending between the casing of the valve and its actuator. The connector can include two spacers made of materials each with a different hot strength wherein the first spacer, fixed adjacent the casing, has a higher hot strength that the second spacer, which is fixed adjacent to the actuator.

14 Claims, 4 Drawing Sheets

(56) References Cited

U.S. PATENT DOCUMENTS

2006/0255309 A1* 11/2006 Marcilese et al. ............ 251/368
2007/0018132 A1* 1/2007 Gethmann et al. ............ 251/366
2011/0006242 A1* 1/2011 Hutchens et al. ............. 251/366

FOREIGN PATENT DOCUMENTS

| | | |
|---|---|---|
| CN | 100375858 C | 3/2008 |
| CN | 201081042 Y | 7/2008 |
| DE | 12 01 366 B | 9/1967 |
| EP | 1 026 369 A1 | 8/2000 |
| EP | 1 223 018 B1 | 5/2005 |
| EP | 1 637 783 A1 | 3/2006 |
| JP | 03-038477 U | 4/1991 |
| JP | 03-088073 U | 9/1991 |
| JP | 07-332521 A | 12/1995 |
| JP | 2004-162733 A | 6/2004 |
| JP | 2006-046110 A | 2/2006 |
| JP | 2007-500316 A | 1/2007 |
| JP | 2007-71357 A | 3/2007 |
| JP | 42088661 B2 | 1/2009 |
| WO | 2005/012777 A1 | 2/2005 |
| WO | WO 2008/014044 A1 | 1/2008 |
| WO | 2010/050609 A1 | 5/2010 |

OTHER PUBLICATIONS

Office Action (Notification of Reasons for Refusal) issued on Jun. 9, 2014, by the Japan Patent Office in corresponding Japanese Patent Application No. 2011-278687, and an English Translation of the Office Action. (10 pages).

First Office Action issued Dec. 3, 2014 by the Chinese Patent Office in corresponding Chinese Patent Application No. 201110443699.5, and an English translation thereof.

* cited by examiner

HIGH TEMPERATURE STEAM VALVE

RELATED APPLICATION(S)

This application claims priority under 35 U.S.C. §119 to European Patent Application No. 10196025.0 filed in Europe on Dec. 20, 2010, the entire content of which is hereby incorporated by reference in its entirety.

FIELD

The disclosure relates to steam valves with actuators, for example, high temperature steam valves and to limiting a heat exposure of such actuators.

For the purpose of this specification, the term "high temperature" can, for example, mean greater than about (i.e., ±1%) 650 degrees Celsius.

BACKGROUND INFORMATION

With a desire to improve steam turbine efficiency there is an interest to increase steam turbine operation temperature. The higher temperatures can create new material challenges. For example, a known heat resistant 12-Cr steel alloy, which can be suitable for use up to about 610 degrees Celsius, is not suitable when temperatures exceed about 650 degrees Celsius. In such cases a more suitable, but more expensive, nickel alloy can be desired.

Special material considerations are used not only for valve bodies but also for valve actuators. However, due to internal works of actuators, problems caused by high temperature may not be solved merely by material selection. The temperature exposure of the actuator can also be limited.

One way of achieving this is to cool the valve casing so that excessive heat is not transferred to the actuator. U.S. Pat. No. 7,481,058 B2 describes one such cooling configuration in which the valve casing is provided with cooling ports and means to pass cooling medium through these ports. Such configurations can be complex and further involve the configuration and supply of a cooling medium.

An alternative is to provide a distance spacer, made of a high hot strength material, between the valve casing and the actuator. Having a high hot strength material means the connector spacer can tolerate the conducted heat energy from the valve casing while its length further enables it to lose some of this heat convectively. This can create a temperature gradient between the casing and the actuator. By configuring the spacer length, a significantly large temperature gradient can be created so that the actuator is not exposed to excessive temperatures. However, in providing the temperature gradient, the space should be configured to withstand the high temperature of the valve casing. For valves in high steam temperature service this can mean the spacer should be made of expensive nickel-alloy.

Exemplary embodiments as disclosed herein can provide alternate simple cost effective solutions that overcome the excessive heat exposure of steam valve actuators when placed in, for example, about 650 degrees Celsius steam service.

SUMMARY

A high temperature steam valve is disclosed comprising: a casing; a connector fixed adjacent to the casing; and an actuator fixed adjacent to the connector for operating the valve. The connector comprises: a first spacer with first and second ends, the first end fixed adjacent to the casing; and a second spacer with an extended portion that spans between first and second ends, the first and second ends of the second spacer each having a face wherein the face of the first end of the second spacer is fixed adjacent to the second end of the first spacer and the face of the second end of the second spacer is fixed adjacent to the actuator, wherein the second spacer is made of a material with a lower hot strength than the first spacer.

BRIEF DESCRIPTION OF THE DRAWINGS

By way of example, exemplary embodiments of the present disclosure are described more fully hereinafter with reference to the accompanying drawings, in which.

DETAILED DESCRIPTION

Figure 1:
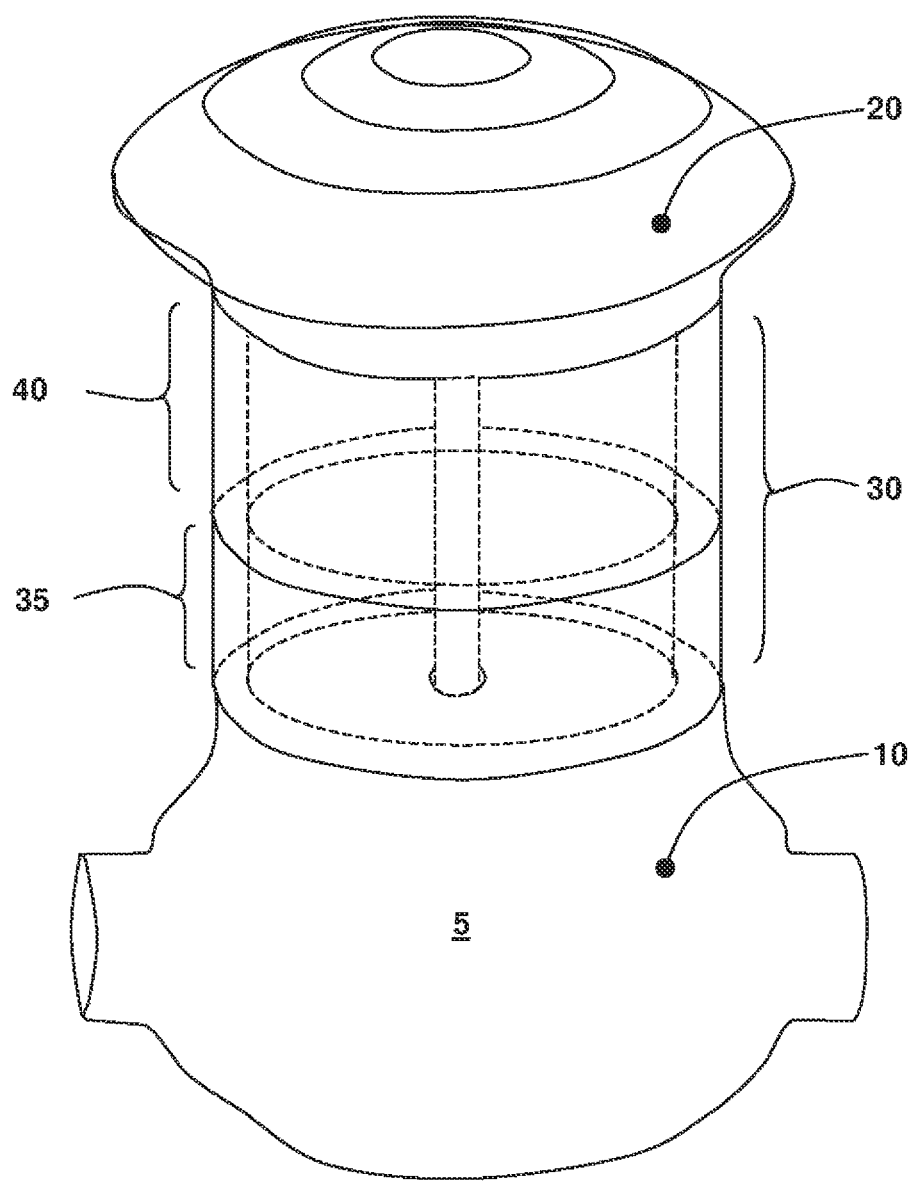
FIG. 1 is a perspective view of a high temperature steam valve according to an exemplary embodiment of the disclosure.

A steam valve of an exemplary embodiment of the disclosure can overcome conductive heat exposure of a steam valve actuator in high temperature steam service.

An exemplary embodiment of the disclosure also can provide a high temperature steam valve spacer between an actuator and casing that has graded temperature resistance.

According to an exemplary embodiment, there is provided a high temperature steam valve including a casing, an actuator for operating the valve, and a connector that at one end is fixed adjacent to the casing and at a second end is fixed to an actuator. The connector has first and second spacers, each with first and second distal ends. The first end of the first spacer is fixed adjacent to the casing and its second end is fixed adjacent to the second spacer. The second end of the second spacer is then further fixed adjacent to the actuator. The second spacer can be made of a material with a lower hot strength than the first spacer. Throughout this specification "hot strength" is a term of art that can be defined as a maximum stress a material subjected to a stretching load can withstand without tearing. The term is related in the art to "tensile strength."

The first spacer length can be configured so that during valve operation, the second spacer is not exposed to a temperature that exceeds its hot strength while being configured short enough to minimise the use of hot strength material.

In an exemplary embodiment according to the disclosure, the first spacer includes a plurality of distance spacers that are spaced apart from each other to create an air gap therebetween. This gap can reduce the thermal heat energy transferred to the first spacer from the casing. The spacers can further include surface irregularities that can be configured to increase surface areas to increase the convective heat loss from the spacers to increase the thermal gradient along their extensional length. In this way, shorter spacers, with lower material weight, can be provided.

In an exemplary embodiment according to the disclosure, screws, for example, can fix the first spacer to the second spacer and the first spacer to the casing respectively. The same screw can be used to fix the first spacer, the second spacer and the casing together. The screws can provides an alternative to welding that overcomes issues of welding together dissimilar metals.

In an exemplary embodiment according to the disclosure, a heat-insulating member, can be made, for example, of ceramic or a metal with low heat conductivity, and is located between the first spacer and the casing.

To reduce the heat flow, the flange of the first spacer to the casing, the flange of the first spacer to the second spacer, and the flange of the second spacer to the actuator, can include grooves in the split plane to further reduce the heat flow.

Other aspects and advantages of the present disclosure will become apparent from the following description, taken in connection with the accompanying drawings.

In the following description, for purposes of explanation, numerous specific details are set forth to provide an understanding of the exemplary embodiments. It will be evident, however, that various embodiments can be practiced without these specific details.

Figure 2:
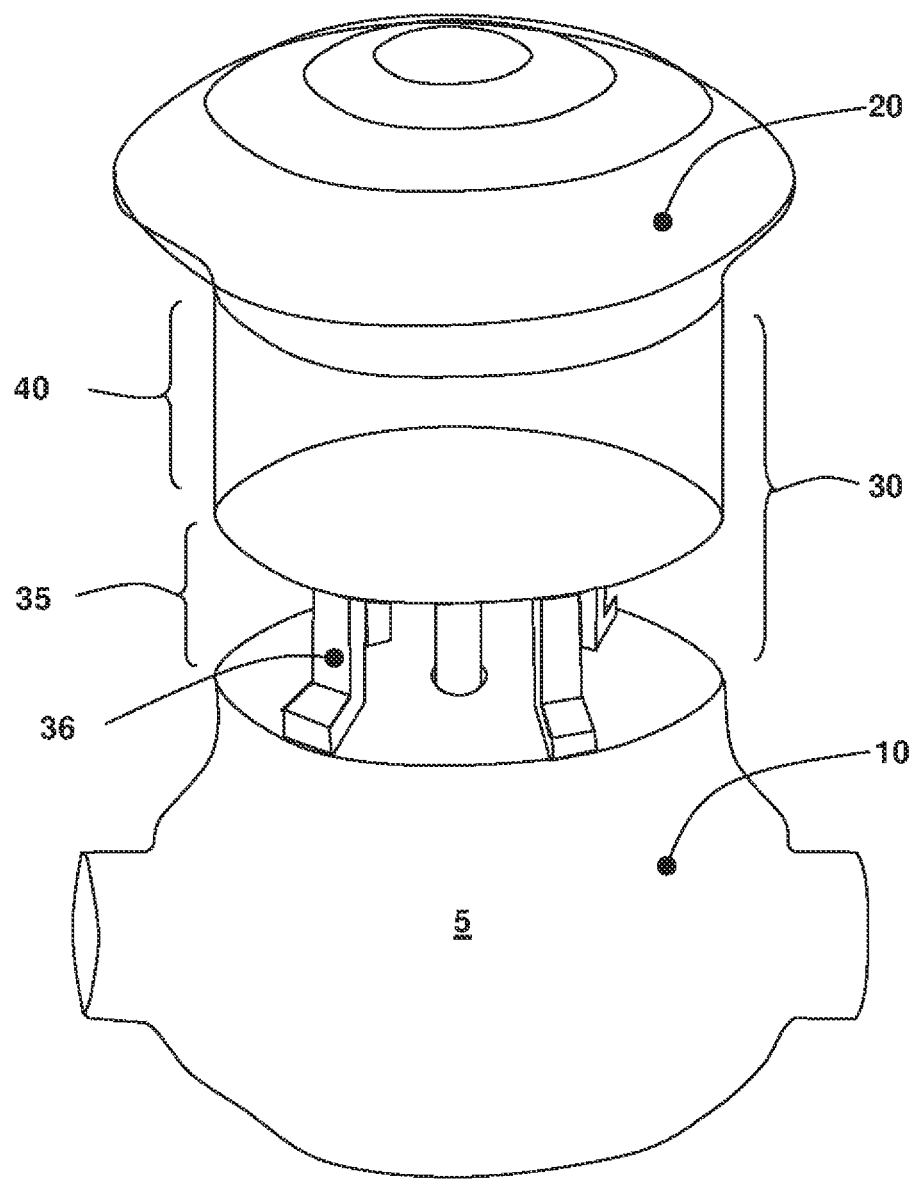
FIG. 2 is a perspective view of the disclosure of a high temperature steam valve according to an exemplary embodiment of the disclosure.

FIGS. 1 and 2 show a high temperature steam valve 5 that has a casing 10, an actuator 20 for operating the valve 5 and a connector 30 extending between the casing 10 and the actuator 20. In the exemplary embodiments shown in FIGS. 1 and 2 the connector 30 includes at least two distinct spacers 35, 40. A first spacer 35, having a higher hot strength, fixed adjacent to the casing 10 and a second spacer 40, having a lower hot strength, fixed adjacent to the first spacer 35 and the actuator 20 such that it is between the first spacer 35 and the actuator 20.

In this arrangement, during operation, a natural temperature gradient across the extensional length of the spacers 35, 40 can be created due to convective heat loss to the surrounding environment. The first spacer 35, as it is adjacent the casing 10 and therefore exposed to the high temperatures of the casing 10, in an exemplary embodiment, can be made of the same material as the casing 10. However, due to the temperature gradient across the first spacer 35 the second spacer 40 can be made of a material with a lower hot strength that the first spacer 35. This can be, for example, stainless steel instead of a nickel alloy. Further heat loss along the extensional length of the second spacer 40 can also result in a lowering of the temperature at the distal end of the second spacer 40. In an exemplary embodiment, the length of the second spacer 40 can be configured, in view of this temperature gradient, so that the actuator 20 is not exposed to excessive temperature.

Figure 4:
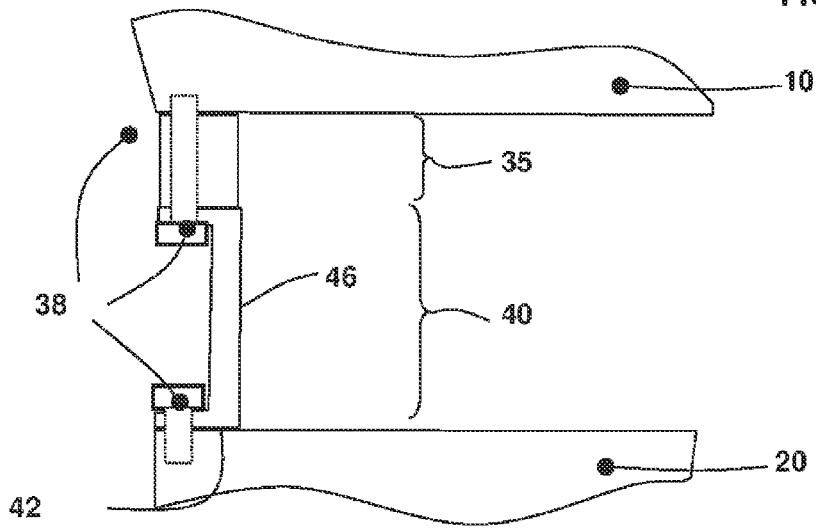
FIG. 4 is an expanded view of the connector of the valve of FIG. 1 or 2 showing details of an exemplary embodiment of a connection arrangement of the connector of the disclosure.
Figure 6:
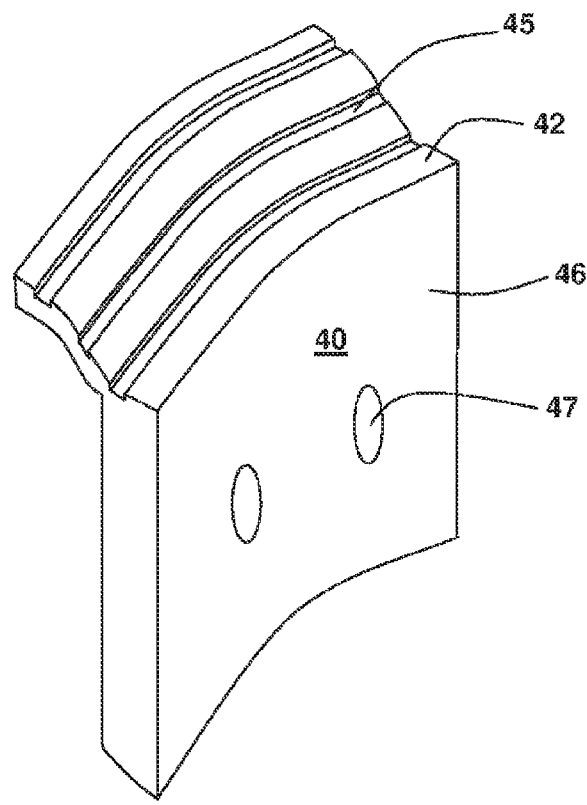
FIGS. 6 and 7 are schematic views of portions of a spacer of exemplary embodiments of the disclosure, showing face features of the portion.
Figure 7:
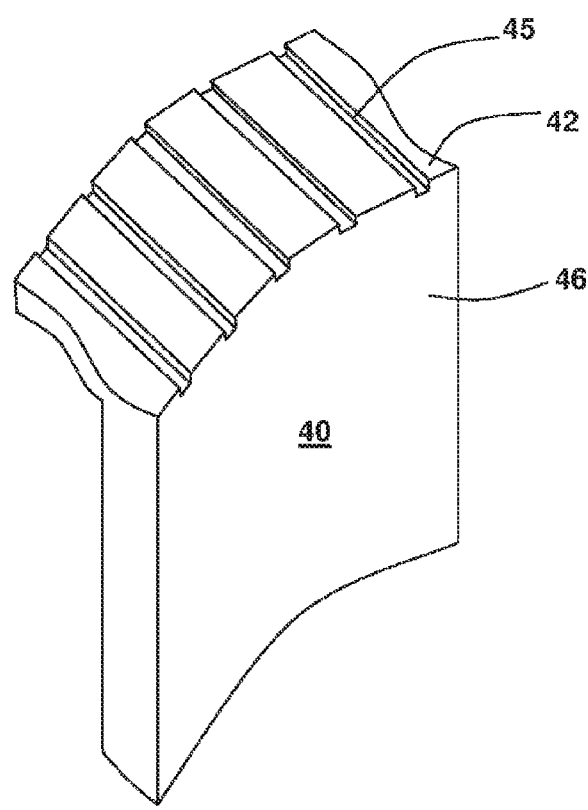

As shown in FIG. 4, in an exemplary embodiment, the second spacer 40 has an extended portion 46 spanning between first and second distal ends that each have a face 42, wherein the face 42 of the first end is fixed adjacent to the second end of the first spacer 35 and the face 42 of the second end is fixed adjacent to the actuator 20. In an exemplary embodiment, one or both faces 42 of the second spacer 40 can include grooves 45, as shown in FIGS. 6 and 7, which can be formed in a radial direction to form radial grooves, a circumferential direction to form circumferential grooves or any of other direction to form grooves in a direction between these two extremes. The grooves 45 can limit surface contact between the first spacers and second spacers 40, thus reducing the conductive heat transfer rate.

By segmenting the connector 30 along its extensional length between the casing 10 and actuator 20, it can be possible to reduce the amount of expensive high hot strength material need to make the part.

Many factors can be involved in defining the minimum extensional length of the first spacer 35 required to ensure sufficient convective heat loss from the first spacer 35 and the second spacer 40 and thus ensure that, in operation, the hot strength of the second spacer 40 and the actuator 20 are not exceeded. These factors include but are not limited to, casing 10 temperature, first spacer 35 surface areas per extensional length, the thermal conductivity of the material of the spacers 35, 40, ambient temperature and the presence of any insulation or other means that may limit convective heat loss.

In the exemplary embodiment shown in FIG. 1 the first spacer 35 can be a unitary hollow cylindrical spacer. "Unitary" in this context can mean made of one piece.

In an exemplary embodiment, as shown in FIG. 2, the first spacer 35 can include a plurality of distance spacers 36 spaced apart from each other so as to create an air gap therebetween. By this arrangement the contact surface between the first spacer 35 and casing 10 can be reduced thus reducing the total conducted thermal energy provided to the first spacer 35. In addition, by the distance spacers 36 being individual spacers, the surface area to volume ratio of the first spacer 35 can be increased to increase convective losses from the first spacer 35. This can result in a steeper temperature gradient and enable shortening of the first spacer 35. All these factors can combine to reduce the quantity of potentially more expensive high hot strength material that is used to form the first spacer 35 that shields the actuator 20.

In an exemplary embodiment, shown in FIG. 6, the second spacer 40 can include openings 47, in the extended portion 46. The openings can reduce heat flow across of the second spacer 40.

In an exemplary embodiment, the first spacer 35 can be provided with surface area increasing feature or features. Such features can include surface roughing, surface grooves, and any other surface configuration that increases the surface area of a spacer.

In an exemplary embodiment, the casing 10 and the first spacer 35 can be made of similar material so that both features can withstand similar thermal stresses.

Figure 3:
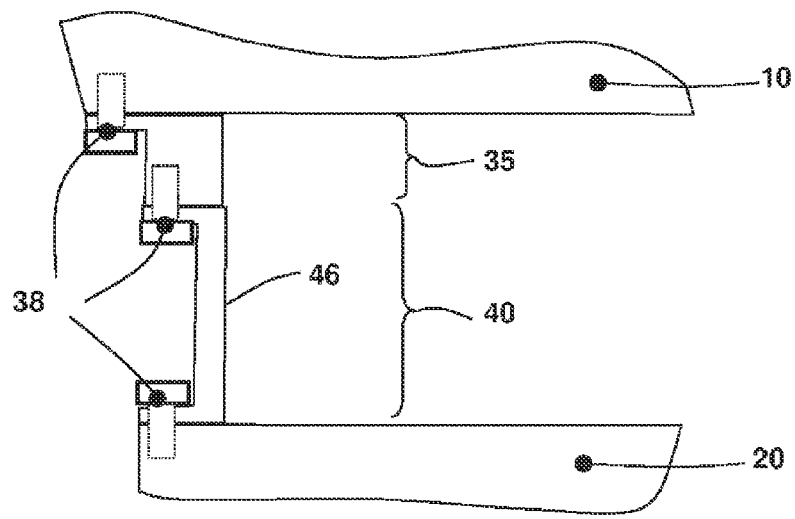
FIG. 3 is an expanded view of the connector of the valve of FIG. 1 or 2 show details of an exemplary embodiment of a connection arrangement of the connector of the disclosure.

FIG. 3 shows various exemplary embodiments in which for example, screws 38 are used to fix the first spacer 35 to the second spacer 40 and the first spacer 35 to the casing 10 respectively. In an exemplary embodiment, shown in FIG. 2, screws 38 can be used to fix the first spacer 35 and second spacer 40, and the first spacer 35 and the casing 10 together. In another exemplary embodiment, as shown in FIG. 4, screws 38 fix the first spacer 35, the second spacer 40 and the casing 10 together.

In this specification "to fix" and "fixing" can mean to make firm the relative location of two parts or spacers. "Fixing" may or may not include actual contact.

In exemplary embodiments of the disclosure, a combination of welding and screw 38 can connect the various parts, such as the casing 10 and the actuator 20 and the spacers 35,40 of the connector 30, together.

While in some cases, for example, welding can be used to connect parts, such as the casing 10 and actuator 20, and spacers 35, 40 it may not be possible, or at least be difficult, to join by welding due to their dissimilar composition. The exemplary embodiments shown in FIGS. 3 and 4 therefore provide an alternative for joining.

In an exemplary embodiment, the fixing of the spacers 35, 40 to each other can be achieved by a combination of powder metallurgy and hydrostatic pressing. For example, powdered material of the spacers 35, 40 are placed in a common mould after which they are hydrostatically pressed. This pressing can increase the temperature of powdered material to the point where the spacers 35, 40 can be cast and forged together. In this exemplary embodiment, the interface between the different materials of the spacers 35, 40 can define the boundary between them.

Figure 5:
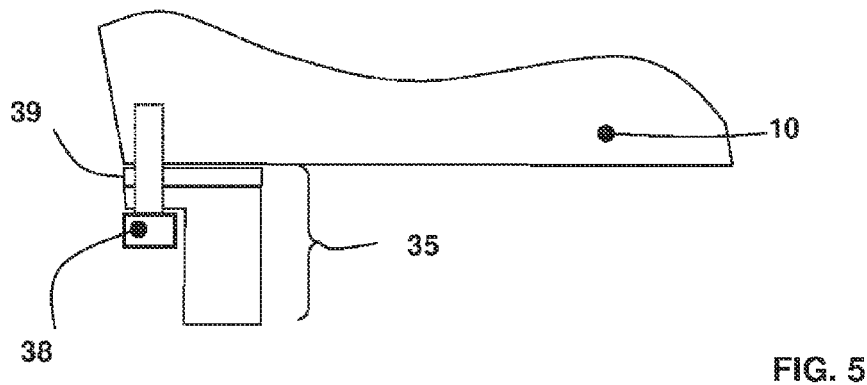
FIG. 5 is an expanded view of a spacer of the connector of the valve of FIG. 1 or 2 showing an exemplary embodiment of an insulation spacer of the disclosure.

FIG. 5 shows an exemplary embodiment in which a heat-insulating member 39 is located between the first spacer 35 and the casing 10. These insulating members 39 can limit heat conduction to the first spacer 35 to positively influence the required extensional lengths of these spacers 35 i.e. enabling them to be made shorter. In an exemplary embodiment, the heat-insulating member 39 can be made of ceramic due to its excellent heat insulation properties. However as ceramic cannot be welded to metals, the ceramic parts are fitted by, for example, screws 38.

In an exemplary embodiment, an additional or alternative heat-insulating member 39 can be located between the first and the second spacers 35, 40.

In an exemplary embodiment an additional or alternative heat-insulating member 39 can be located between the second spacer 40 and the actuator 20.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS

5 Valve
10 Casing
20 Actuator
30 Connector
35 First spacer
36 Distance spacer
38 Screw means
39 Insulating member
40 Second spacer
42 Face
45 Groove
46 Extended portion
47 Openings

What is claimed is:

1. A high temperature steam valve comprising:
a casing;
a connector fixed adjacent to the casing; and
an actuator fixed adjacent to the connector for operating the valve,
the connector comprising:
  a first spacer with first and second ends, the first end fixed adjacent to the casing; and
  a second spacer with an extended portion that spans between a first end face and a second end face, wherein the first end face of the second spacer faces and abuts the second end of the first spacer and the second end face of the second spacer faces and abuts the actuator,
  wherein the second spacer is made of a material with a lower hot strength than the first spacer,
  wherein at least one end face of the second spacer includes surface irregularities for increasing a surface area of the at least one end face to increase convective heat loss, the surface irregularities include at least one of a plurality of radial grooves and/or circumferential grooves.

2. The valve of claim 1, wherein a length between the first and the second ends of the first spacer is configured so that, when in operation, due to convective heat loss from the first spacer, the second spacer will not exceed its hot strength.

3. The valve of claim 1, wherein the extended portion comprises:
openings for reducing heat flow across of the second spacer.

4. The valve of claim 1, wherein the casing and the first spacer are made of the same material.

5. The valve of claim 1, wherein the second spacer is made of stainless steel.

6. The valve of claim 1, comprising:
means for fixing the first spacer to the second spacer and for fixing the first spacer to the casing respectively.

7. The valve of claim 6, wherein the means for fixing extends through the first spacer, the second spacer, and casing respectively.

8. The valve of claim 1, the first spacer comprising:
a unitary hollow cylinder.

9. The valve of claim 8, wherein a length between the first and the second ends of the first spacer is configured so that, when in operation, due to convective heat loss from the first spacer, the second spacer will not exceed its hot strength.

10. The valve of claim 8, comprising:
a heat-insulating member located between the first spacer and the casing.

11. The valve of claim 10, wherein the heat-insulating member is made of ceramic.

12. A high temperature steam valve comprising:
a casing;
a connector fixed adjacent to the casing; and
an actuator fixed adjacent to the connector for operating the valve via a stem extending between the actuator and the casing,
the connector comprising:
  a first spacer including a plurality of spacers spaced apart from each other so as to create air gaps therebetween, each of the plurality of spacers having an extended portion that spans between first and second ends, the first ends fixed adjacent to the casing;
  a second spacer with an extended portion that spans between first and second ends, the first and second ends of the second spacer each having a face wherein the face of the first end of the second spacer is fixed adjacent to the second ends of the first spacer and the face of the second end of the second spacer is fixed adjacent to the actuator,
wherein the second spacer is made of a material with a lower hot strength than the first spacer.

13. The valve of claim 12, wherein a length between the first and the second ends of the first spacer is configured so that, when in operation, due to convective heat loss from the first spacer, the second spacer will not exceed its hot strength.

14. The high temperature steam valve according to claim 12, comprising:
a heat-insulating member located between the first spacer and the casing; and
the heat-insulating member is made of ceramic.

* * * * *